United States Patent
Liu (10) Patent No.: US 7,595,596 B2
(45) Date of Patent: Sep. 29, 2009

(54) POWER-SAVING CONTROL CIRCUIT AND METHOD FOR OLED PANEL

(75) Inventor: Jing-Meng Liu, Jubei (TW)

(73) Assignee: Richtek Technology Corporation, Hsin-Chu (TW)

( * ) Notice: Subject to any disclaimer, the term of this patent is extended or adjusted under 35 U.S.C. 154(b) by 185 days.

(21) Appl. No.: 11/784,313

(22) Filed: Apr. 6, 2007

(65) Prior Publication Data
US 2008/0169772 A1 Jul. 17, 2008

(30) Foreign Application Priority Data
Jan. 12, 2007 (TW) .............................. 96101234 A (51) Int. Cl.
*G05F 1/00* (2006.01)
(52) U.S. Cl. .................... 315/307; 315/291; 315/209 R
(58) Field of Classification Search ................. 315/291, 315/299, 209 R, 210, 294, 297, 298, 300, 315/301
See application file for complete search history.

(56) References Cited

U.S. PATENT DOCUMENTS

2007/0114951 A1*  5/2007  Tsen et al. .................. 315/291

* cited by examiner

*Primary Examiner*—Douglas W Owens
*Assistant Examiner*—Jianzi Chen
(74) *Attorney, Agent, or Firm*—Tung & Associates (57) ABSTRACT

The present invention discloses a power-saving control circuit for an OLED panel, comprising: a plurality of OLEDs respectively located in a corresponding plurality of paths; a current amount determination circuit determining current amounts on the plurality of paths; a voltage supply circuit under control by a control signal, for providing an output voltage to the current amount determination circuit; and a matching feedback adjustment circuit for generating the control signal according to a difference among the current amounts of the plurality of paths.

8 Claims, 9 Drawing Sheets

POWER-SAVING CONTROL CIRCUIT AND METHOD FOR OLED PANEL

BACKGROUND

1. Field of Invention

The present invention relates to a power-saving control circuit for an OLED (organic light emitting diode) panel, and a method thereof. In particular, the present invention relates to a control circuit and a method which adaptively adjusts the supply voltage of OLEDs so that the power consumption of the OLED panel is effectively controlled.

2. Description of Related Art

Figure 1:
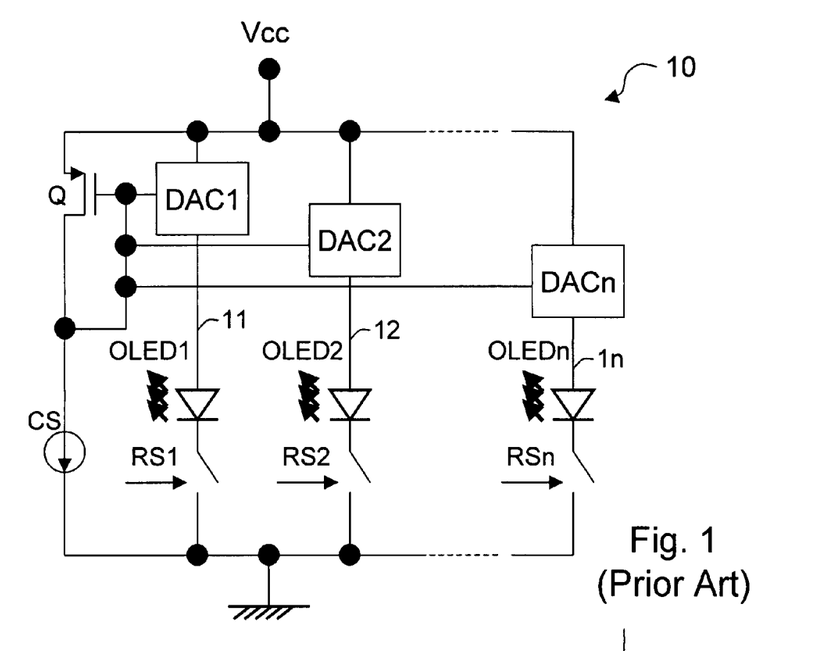
FIG. 1 is a schematic circuit diagram showing a typical structure of a conventional passive OLED panel control circuit.
Figure 2:
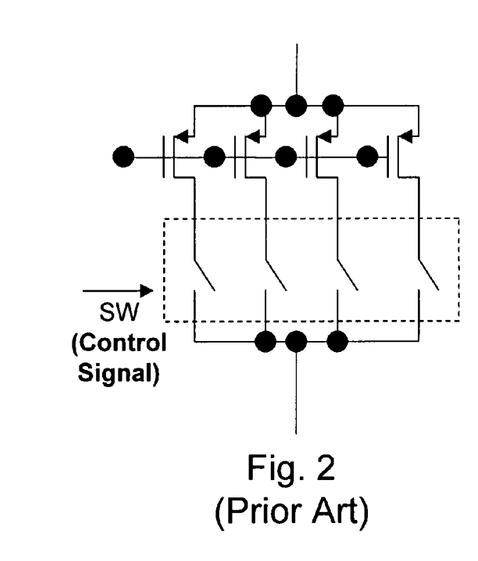
FIG. 2 shows a simple type DAC.
Figure 3:
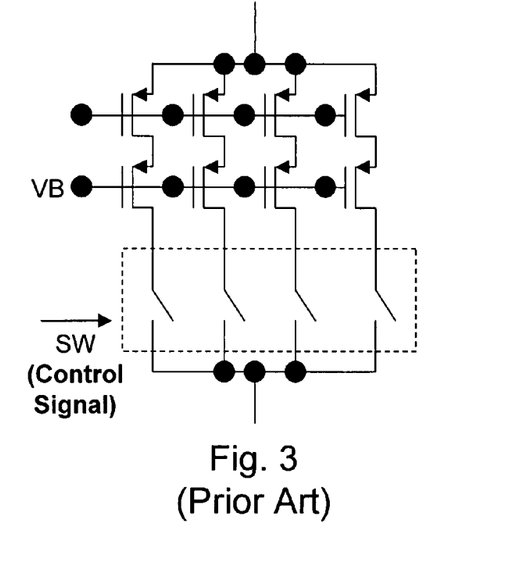
FIG. 3 shows a cascoded type DAC.

FIG. 1 is a schematic circuit diagram showing a typical structure of a conventional passive OLED panel control circuit 10. As shown in the figure, the circuit 10 includes n organic LEDs OLED1-OLEDn, respectively located in paths 11-1n. The conduction of each of the paths 11-1n is controlled by a corresponding signal RS1-RSn; in a passive OLED panel, each path is conducted in turn so that the panel shows an image as a whole (by residual vision of human eyes). The brightness of each of the organic LEDs OLED1-OLEDn is controlled by the current amount on the corresponding path 11-1n, which is controlled by a corresponding digital to analog converter (DAC) DAC1-DACn. For simplicity of the figure, each DAC is only connected with one OLED, but it may be connected with more than one OLED in a real case. Each digital to analog converter DAC1-DACn may be of a relatively simple structure as shown in FIG. 2, or of a cascoded type structure as shown in FIG. 3.

More specifically, the brightness of each of the organic LEDs OLED1-OLEDn is controlled as follows. The transistor Q and a transistor in each of the digital to analog converters DAC1-DACn forms a current mirror, which mirrors the current of the current source CS proportionally to each of the digital to analog converters DAC1-DACn. A digital control signal SW, also referred to as the column signal, or segment signal, determines which transistors in the DAC are conducted. As an example, the current amount flowing through the transistors shown in FIG. 2 may respectively be 1×, 2×, 4×, and 8×, so that a 16-level brightness variation may be generated according to the digital control signal SW.

For an OLED panel, power consumption and heat dissipation have been the primary concerns. In the abovementioned prior art, to assure that each of the organic LEDs OLED1-OLEDn functions normally, usually a designer tends to design the value of the supply voltage Vcc in a conservative way (that is, to assign a higher value than necessary to assure the brightness of the OLEDs). Therefore, the human-assigned value of Vcc is often not optimum (not the minimum required voltage). This inevitably causes unnecessary power consumption and increases heat.

SUMMARY

In view of the foregoing, it is desirous, and thus an object of the present invention, to provide an OLED panel control circuit which adaptively adjusts the supply voltage of OLEDs so that the power consumption of the OLED panel is effectively controlled, to overcome the drawbacks in the prior art.

Another object of the present invention is to provide an OLED panel control method which adaptively adjusts the supply voltage of OLEDs.

In accordance with the foregoing and other aspects of the present invention, and as disclosed by one embodiment of the present invention, a power-saving control circuit for an OLED panel comprises: a plurality of OLEDs respectively located in a corresponding plurality of paths; a current amount determination circuit determining current amounts on the plurality of paths; a voltage supply circuit under control by a control signal, for providing an output voltage to the current amount determination circuit; and a matching feedback adjustment circuit for generating the control signal according to a difference among the current amounts of the plurality of paths.

Preferably, when the difference among the current amounts of the plurality of paths is larger than a predetermined value, the voltage supply circuit increases its output voltage; when the difference among the current amounts of the plurality of paths is smaller than the predetermined value, the voltage supply circuit decreases or keeps its output voltage.

In addition, according to another embodiment of the present invention, a power-saving control method for an OLED panel comprises: providing a supply voltage to a plurality of paths, each path having a corresponding OLED; detecting a difference among the current amounts of the plurality of paths; when the difference among the current amounts of the plurality of paths is larger than a predetermined value, increasing the supply voltage; and when the difference among the current amounts of the plurality of paths is smaller than the predetermined value, decreasing or keeping the supply voltage.

In the context of the present invention, "the difference among the current amounts of the plurality of paths" means "the difference among the current amounts of the plurality of paths under the same setting", that is, the matching difference (or mismatching) among the plurality of paths. Such matching difference can affect the brightness and the color uniformity of an OLED panel.

Preferably, the above method further comprises the steps of: providing a main path, and mirroring the current on the main path to the plurality of paths proportionally.

More preferably, the above method further comprises the steps of: providing a transistor on the main path; fixing the supply voltage at a voltage value; adjusting the current amount on the main path to control the gate to source voltage of the transistor; fixing the current amount on the main path; resuming the supply voltage to a state in which it is adjustable; and adjusting the supply voltage according to the difference among the current amounts of the plurality of paths.

Or, the above method further comprises the steps of: adjusting the current amount on the main path; and adjusting the supply voltage according to the relationship between the current amount on the main path and the supply voltage.

Or, the above method further comprises the steps of: setting the current amount on the main path to be a function of the supply voltage; adjusting the supply voltage according to the difference among the current amounts of the plurality of paths; and determining the current amount on the main path.

BRIEF DESCRIPTION OF THE DRAWINGS

These and other features, aspects, and advantages of the present invention will become better understood with reference to the following description, appended claims, and accompanying drawings.

DESCRIPTION OF THE PREFERRED EMBODIMENTS

Figure 4A:
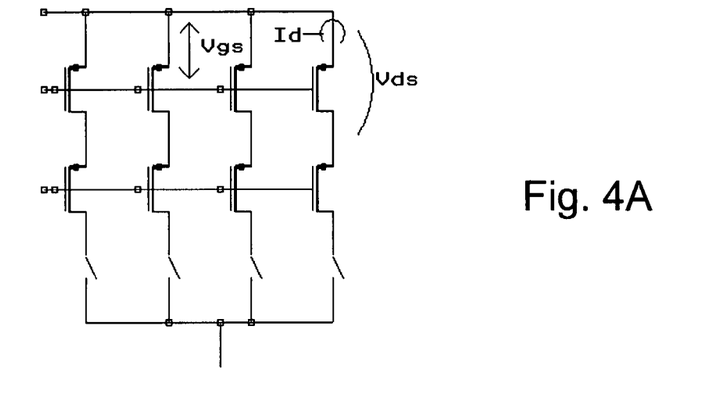
FIGS. 4A-4C explain the principle of the present invention.
Figure 4B:
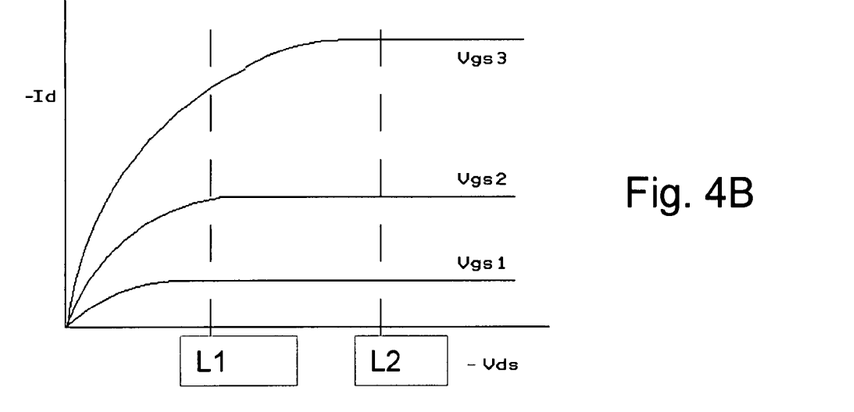
Figure 4C:
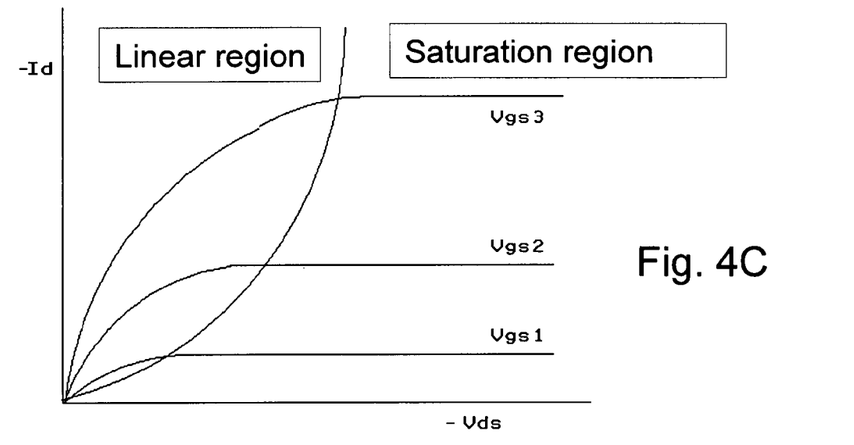

The present invention will first be explained with respect to its principle. Referring to FIGS. 4A-4C, and taking the cascoded type DAC as an example, Vgs represents the gate to source voltage of the first stage (upper) transistor, Vds represents the drain to source voltage of this transistor, and Id represents the current flowing through this transistor. All the transistors have to be in their saturation region to form fully functional current mirrors (referring also to FIG. 1), and to reduce the mismatching effect among the transistors to minimum. For example, referring to FIG. 4B, if three transistors mirror the same current to respectively generate current amounts of 1×, 2×, and 4×, then as shown by the line L1 in the figure, when Vds is low, although the power consumption is low, the current amounts corresponding to the curves of Vgs1, Vgs2, Vgs3 will deviate from the ratio of 1×:2×:4×, and the deviation is worse as Vds is lower. The deviation also exists between two transistors working to provide the same current amount, if there is mismatching between them (due to, e.g., process non-uniformity such as gate length variation). The lower Vds is, the worse the mismatching effect is. The line L2 in FIG. 4 shows that it is only when all the transistors are in their saturation region that the current ratio becomes normal, and the mismatching effect is reduced to minimum. FIG. 4C shows that the higher Vgs is, the higher the required Vds is, to bring a transistor into its saturation region.

Based on the above principle, one primary concept of the present invention is to generate a feedback signal according to the matching condition, and the feedback signal may be used to control the supply voltage Vcc. When the matching condition is worse than desired, it means that at least one transistor has deviated from its saturation region, and thus the present invention increases the supply voltage Vcc to increase Vds. On the other hand, if the matching condition is satisfactory, the supply voltage Vcc does not have to be increased. As such, the present invention adaptively adjusts the supply voltage Vcc to the minimum value that is required for the circuit to work normally, to save power.

Figure 5:
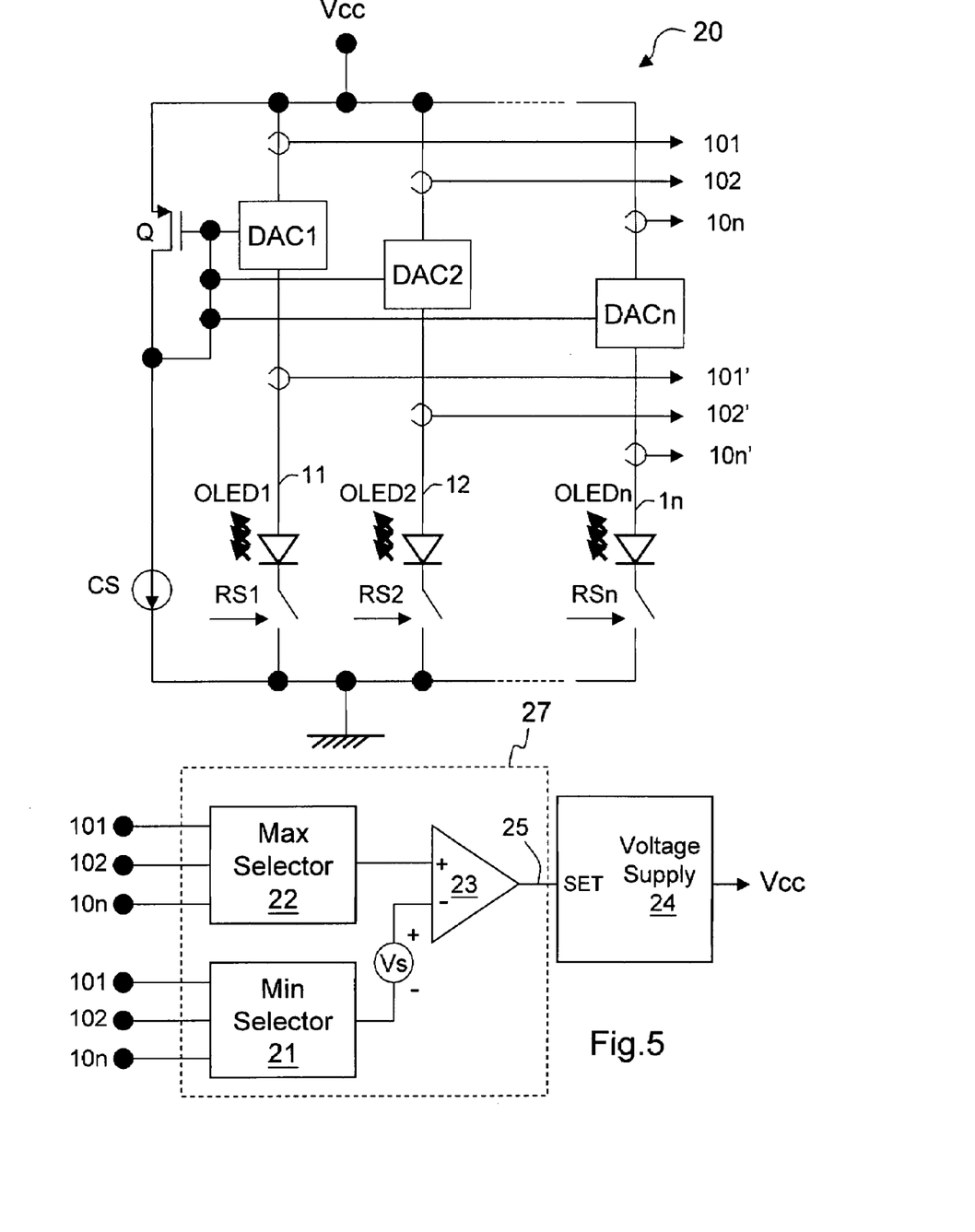
FIG. 5 is a schematic circuit diagram showing one preferred embodiment of an OLED panel control circuit according to the present invention.

FIG. 5 is a schematic circuit diagram showing one preferred embodiment of an OLED panel control circuit according to the present invention. As shown in the figure, in the OLED panel control circuit 20 according to the present embodiment, besides the circuit devices similar to those in the prior art circuit 10, there is a mechanism to adaptively adjust the supply voltage Vcc according to the matching condition. The mechanism is embodied by a matching feedback adjustment circuit 27 shown in the lower part of the figure. More specifically, the circuit 27 senses signals representing the current conditions on the paths 11-1n, and selects the signals having the minimum and the maximum values of them in the minimum signal selector 21 and the maximum signal selector 22. In general, a signal representing a current condition is a voltage, and therefore the minimum signal selector 21 and the maximum signal selector 22 respectively select the signals having the lowest and the highest voltage values. The signals representing the current conditions may be picked up from the upper part of the digital to analog converters DAC1-DACn (such as the signals 101-10n), or from their lower part (such as the signals 101'-10n'), or from their inside (not shown).

The selected minimum and the maximum voltage signals are compared in the circuit 23, after being compensated by a voltage value Vs. The circuit 23 can be a comparator and outputs a digital signal, or be an operational amplifier and outputs an analog signal, depending on the circuit design of the voltage supply circuit 24. If the circuit 23 is a comparator, when its output is high, meaning that the current matching condition among the paths 11-1n is not satisfactory, the voltage supply circuit 24 increases the supply voltage Vcc. When the output of the circuit 23 is low, meaning that the current matching condition among the paths 11-1n is within the desired specification (to be explained later), the voltage supply circuit 24 decreases or keeps the supply voltage Vcc. (It should be noted that the above description is only one among many possible arrangements. The input terminals of the circuit 23 may be reversed, and the other circuit structure should be correspondingly rearranged.) If the circuit 23 is an operational amplifier, its output can be used to control the voltage supply circuit 24 in an analog fashion. For example, the voltage supply circuit 24 may include a power stage controlled by a control circuit. The power stage may be, e.g., a buck converter, a boost converter, an inverter, or a fly-back voltage supplier. The control circuit may be, e.g., a pulse width modulation circuit, a pulse frequency modulation circuit, a pulse skipping modulation circuit, or a linear regulator. The details of such circuits are well known to those skilled in this art, so they are not shown nor explained in detail. When the voltage supply circuit 24 is one among the above, it typically includes an internal error amplifier. Hence, if the circuit 23 is an operational amplifier, it can be integrated into the voltage supply circuit 24, as the internal error amplifier.

The voltage source device Vs in FIG. 5 is shown for better illustrating the idea of the present invention, representing a potential difference in a broad sense. It does not have to be a stand-alone physical device. For example, if a proper input offset voltage is provided between the two inputs of the circuit 23, an equivalent effect may be achieved. Or, if the circuit 23 is an operational amplifier, the same effect may be achieved by properly designing the gain of the circuit 23, or by properly designing the control mechanism by the control signal 25 on the voltage supply circuit 24. The key is that the voltage value Vs defines the specification of the voltage difference between the outputs from the minimum signal selector 21 and the maximum signal selector 22, which corresponds to the maximum tolerance between the highest and lowest current values on the paths 11-1n. When the matching condition among the digital to analog converters DAC1-DACn is worse, the deviation among the current amounts on the paths 11-1n increases, and if the matching condition is better, the deviation is smaller. Hence, a designer may set the voltage value Vs so that if the difference between the maximum and the minimum exceeds Vs, it means that at least one of the transistors is not in its saturation region, and thus Vcc should be increased. Where necessary, the voltage value Vs may be provided as a parameter that can be set externally from an integrated circuit (for example, by an external resistor).

Figure 6:
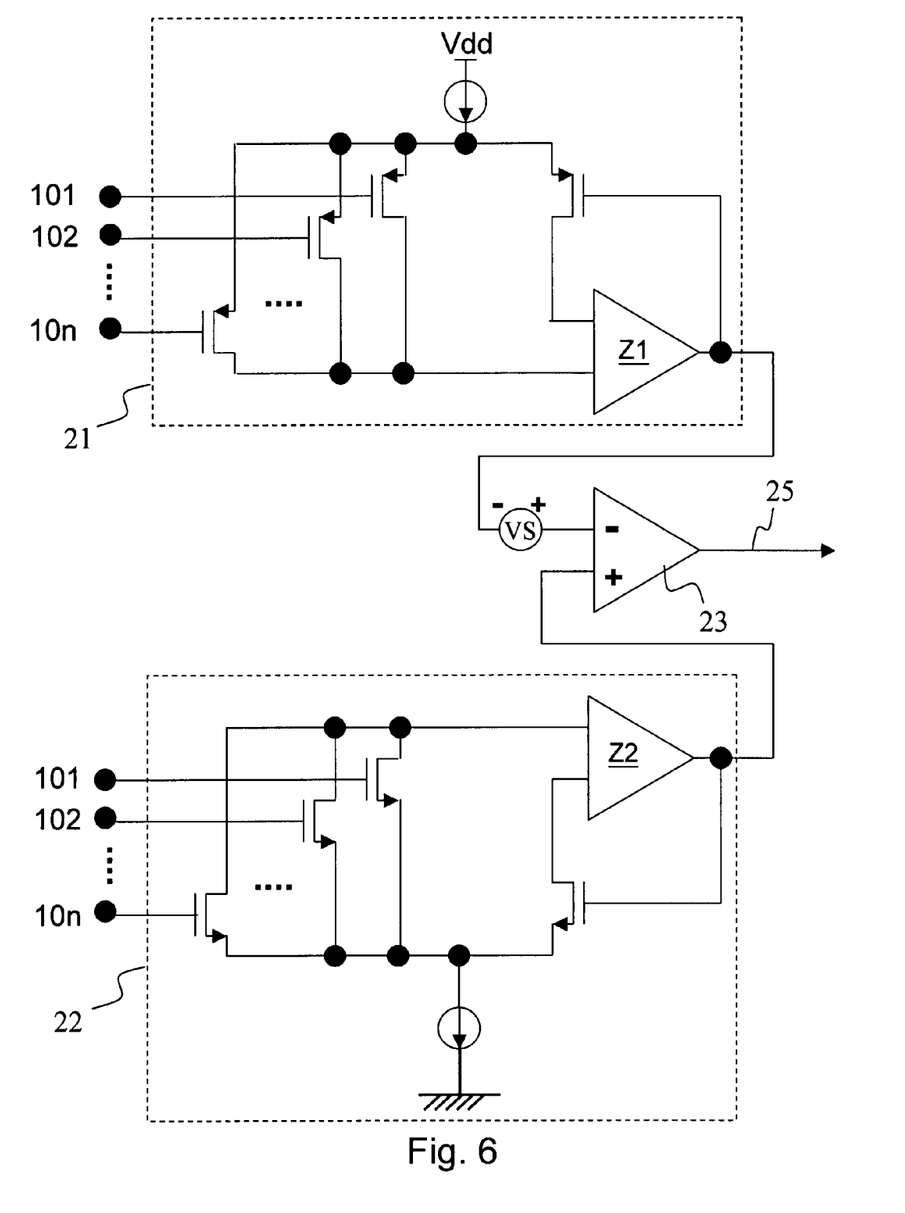
FIG. 6 shows, as an illustrative embodiment, a more detailed structure of some circuit devices in FIG. 5.

An example showing a more detailed structure of the matching feedback adjustment circuit 27 (excluding the voltage supply circuit 24) is illustrated in FIG. 6. The circuit 21 in the upper part of the figure selects the lowest voltage among the nodes 101-10$n$ and outputs a corresponding value through a transimpedance circuit z1; the circuit 22 in the lower part of the figure selects the highest voltage among the nodes 101-10$n$ and outputs a corresponding value through a transimpedance circuit z2. The outputs from the circuits 21 and 22, after compensated by the voltage value Vs, are compared in the circuit 23, to generate the control signal 25 for controlling the voltage supply circuit 24.

Figure 7:
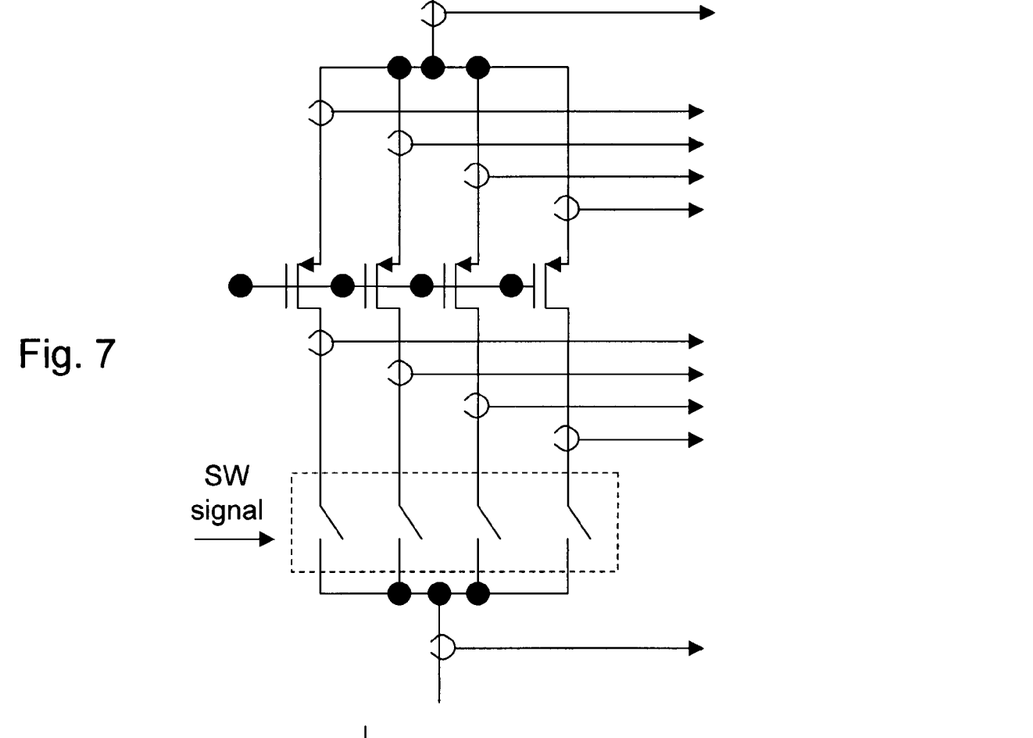
FIGS. 7 and 8 show several possible ways and locations to pick up a current signal according to the present invention.
Figure 8:
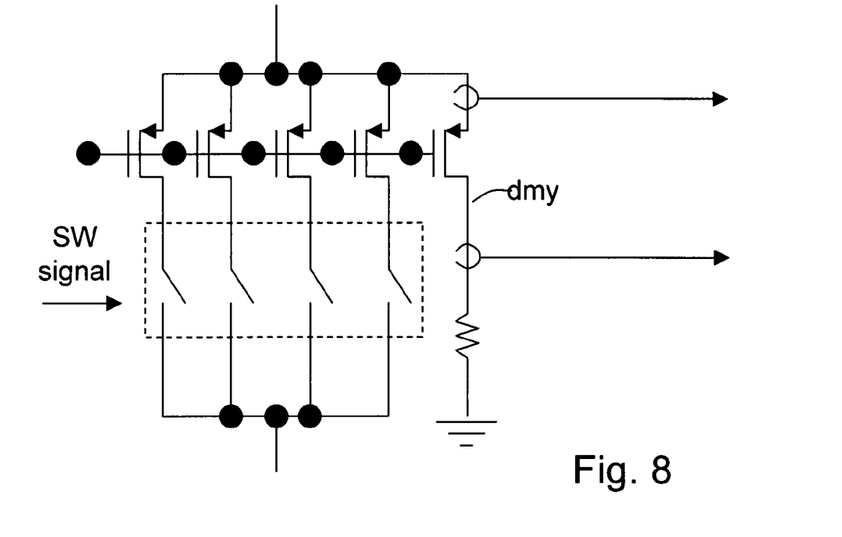
Figure 9:
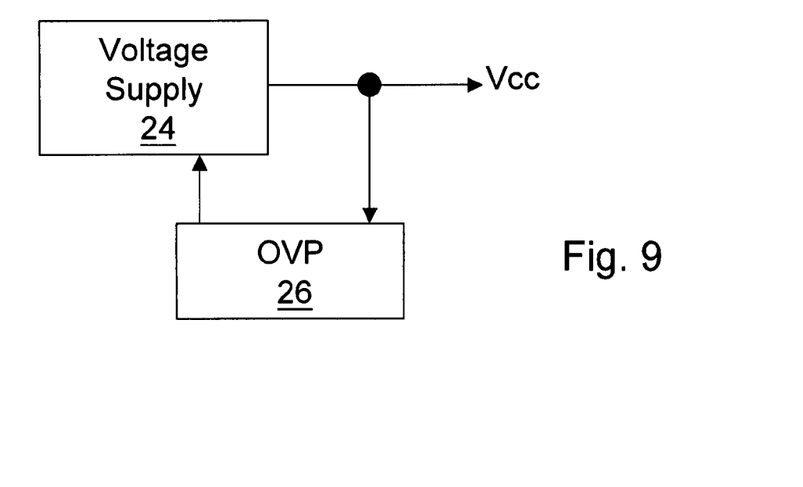
FIGS. 9 and 10 show how an over voltage protection circuit may be embodied.

The locations to sense current amounts are not limited to the nodes 101-10$n$; they may be the locations 101'-10$n$' in FIG. 5, or other locations. FIG. 7 shows several other possible locations. Or, as shown in FIG. 8, the circuit may include a dummy path dmy dedicated for detecting current matching condition. It should be noted that if any location shown in FIG. 7 is used, the digital to analog circuits DAC1-DAC$n$ should be provided with proper SW signals so that the current signals sensed from the paths 11-1$n$ are at the same level. Because proper SW signals are required, which may conflict with the normal operation of the OLED panel, it is preferred that the matching condition is examined during the panel power ON stage, or, a periodic matching check is performed during normal operation of the OLED panel. If the circuit shown in FIG. 8 is adopted, there is no such conflict concern.

Figure 10:
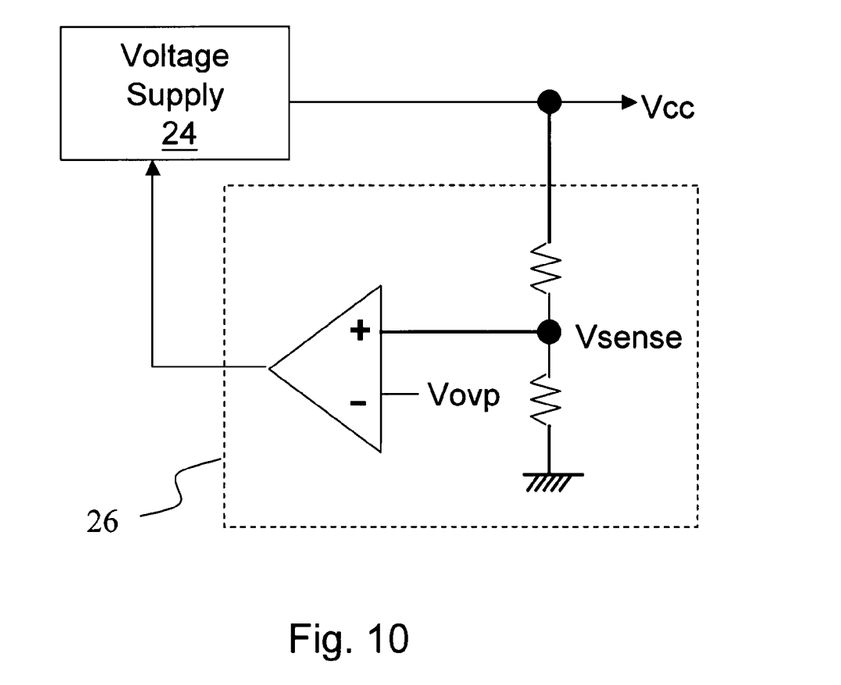

In the above embodiment, to prevent the circuit from increasing the supply voltage Vcc unlimitedly due to circuit failure or mismatching, an over voltage protection circuit (OVP) 26 may be provided to restrict the supply voltage Vcc under an upper limit. The OVP 26 detects the supply voltage Vcc, and sends a signal to stop the voltage supply circuit 24 from increasing its output voltage (depending on circuit design and requirements, the voltage supply may be fully stopped, or kept below an upper limit; the latter is more typical in panel control). One example of the over voltage protection circuit 26 is shown in FIG. 10. As shown in the figure, the voltage at the node Vsense, which is a dividend voltage of the supply voltage Vcc, is compared with a predetermined reference voltage Vovp, and a signal is generated according to the result of the comparison, to control the voltage supply circuit 24.

The present invention has been described with reference to several hardware embodiments. There is one more point that should be mentioned here. An OLED panel usually includes a very large number of OLEDs, and therefore it may not be practical to compare every path that includes an OLED (although this approach is covered by the scope of the present invention). In a case where the number of OLEDs is very large, it may be preferred to sample some of the OLEDs (paths) for matching check, or to group the OLEDs (paths) and perform matching check only within the same group, or to combine the sampling and grouping. For example, one may group all the OLEDs and sample one OLED in each group for comparison; or, one may group all the OLEDs and compare the OLEDs within each group; or, one may arrange more than one OLED in each of the paths 11-1$n$, etc.

Hereinafter the present invention has been described with reference to several application embodiments.

Figure 11:
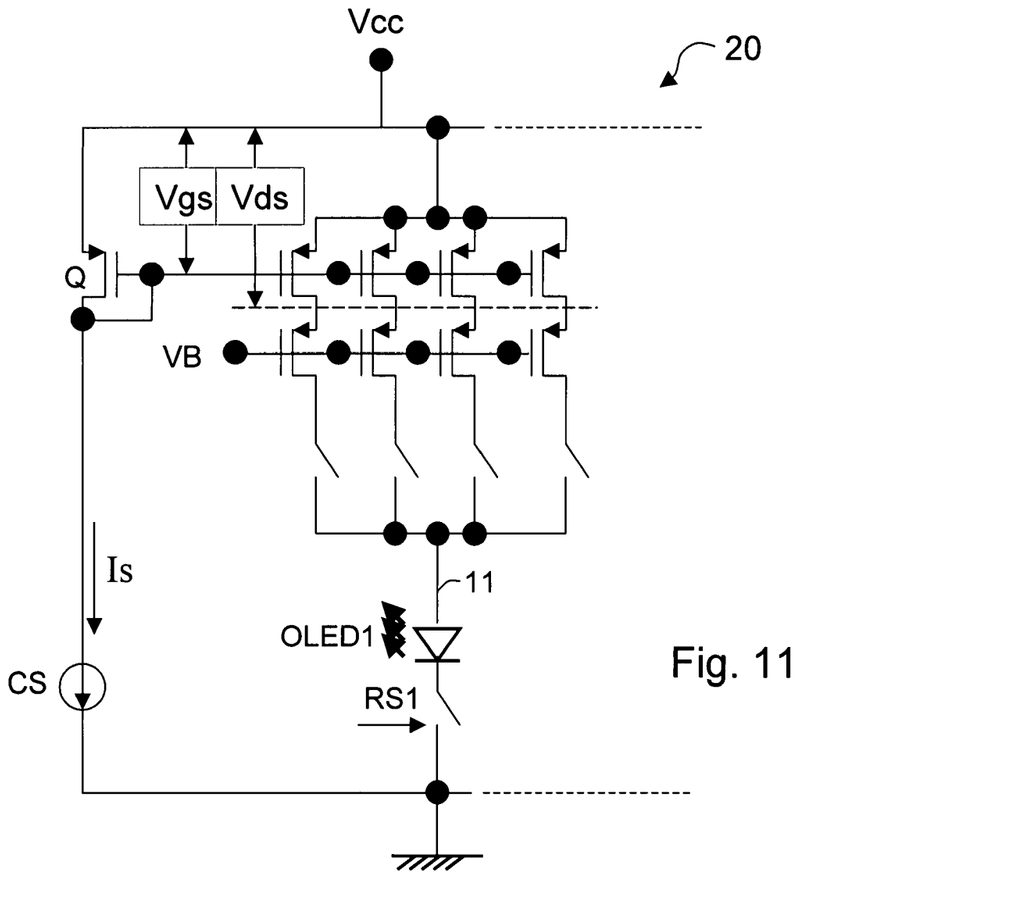
FIG. 11 is a reference figure for better understanding the methods according to the present invention.

Referring to FIG. 11, for simplicity, only one path 11 is shown, and the figure also shows a digital to analog circuit DAC1 and an organic LED OLED1, wherein the digital to analog circuit DAC1 is of the cascoded type.

According to basic transistor physics, the higher Vgs is, the lower the threshold voltage (Vth) mismatching effect is. However, for the digital to analog circuit DAC1 to fully function, the transistors in DAC1 have to be in or near their saturation region. The higher Vgs is, the higher Vds is required to enter the saturation region, and the more power consuming. In brief, higher Vgs reduces Vth mismatching effect but increases power consumption.

Hence, another concept of the present invention is to solve this dilemma. The present invention proposes the following ways to obtain the optimum Vgs and Vds values. In the following concept of the present invention, the current amount Is of the current source CS is a parameter that is controllable. In prior art, the current amount Is of the current source CS is a parameter for controlling the brightness of the OLEDs, and therefore it is not a controllable parameter for seeking the optimum Vgs value. In the present invention, it is a controllable parameter, and the brightness of the OLEDs may be controlled via other means.

According to the present invention, a first method for locating the optimum Vgs and Vds values is as follows. First fix the supply voltage Vcc arbitrarily at a value at which all transistors in all the DACs are ensured to be in their saturation region (but probably not at the lowest power consumption voltage). Next, adjust the current amount Is. Since the supply voltage Vcc is fixed, the adjustment of the current amount Is will affect Vgs; in other words, Vgs is a function of Is, Vgs=f (Is) (referring to FIG. 11). Thus, by varying the current amount Is, one may find a Vgs value that is the lowest one within the matching requirement. After such Vgs value is obtained, the value of Is is fixed, and the supply voltage Vcc resumes from fixed to variable. Through adaptive feedback adjustment for Vcc according to the present invention as explained with reference to the foregoing hardware embodiments, the voltage supply circuit will find the optimum Vds and the optimum supply voltage Vcc for circuit 20 of FIG. 11, even if the arbitrarily set original value is not optimum.

Figure 12:
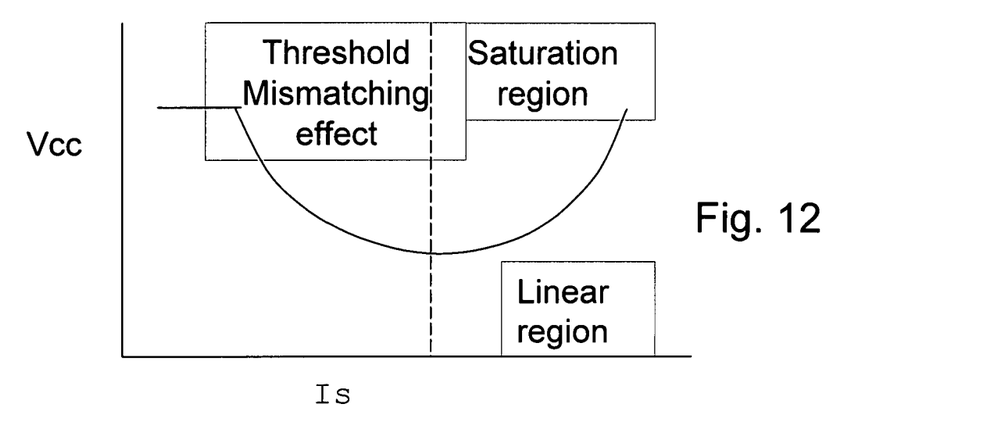
FIG. 12 explains the relationship between the current amount Is and the voltage Vcc.

A second method is as follows. Please refer to FIG. 12 in conjunction with FIG. 11. First, let the circuit 20 work according to its feedback adjustment mechanism for Vcc. Adjust the current amount Is to find the lowest supply voltage Vcc. As seen from FIG. 12 which shows the relationship between Is and Vcc, at any given Is, the voltage supply circuit will adjust the supply voltage Vcc to a minimum value keeping circuit 20 in current matching specification, and the Vcc vs. Is curve can be shown as in the FIG. 12. Therefore, by varying the value of Is, one may obtain the optimum Is and Vcc.

Figure 13:
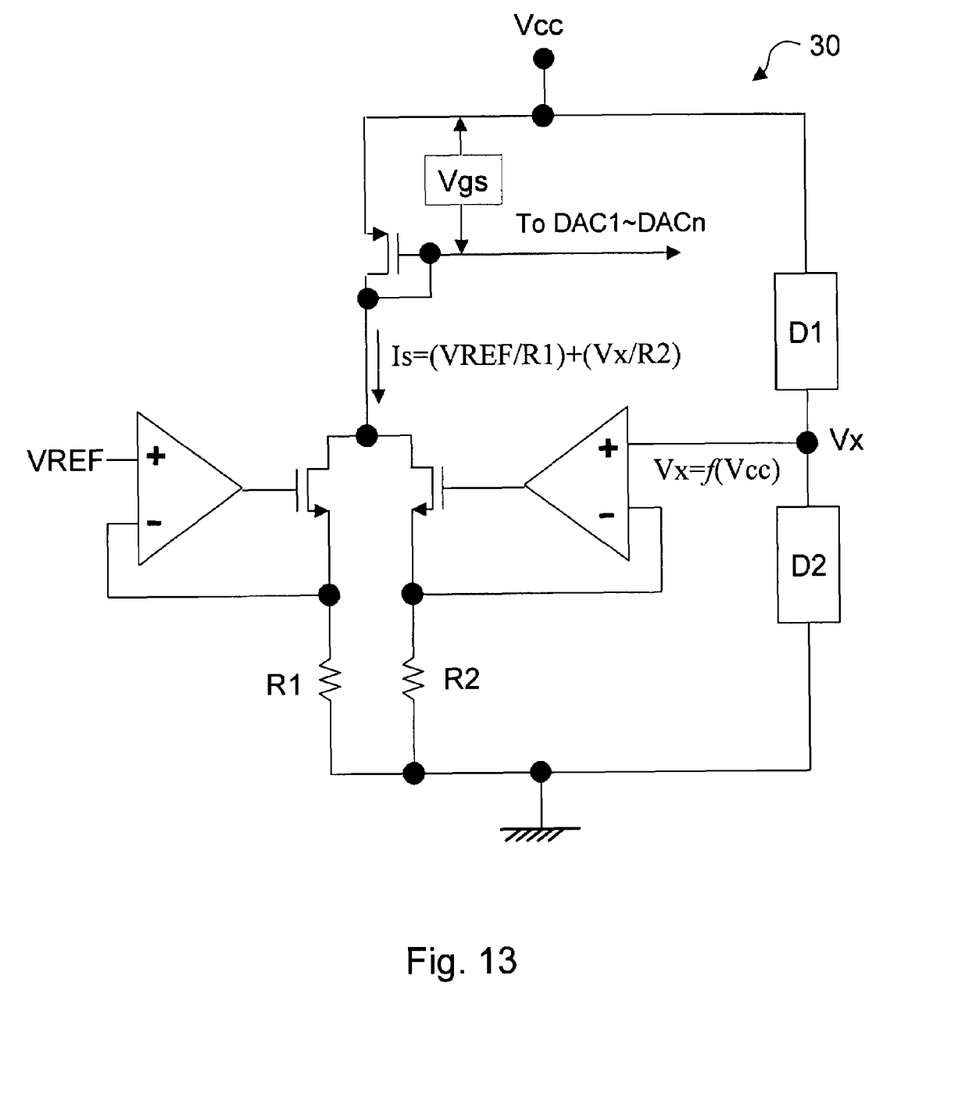
FIG. 13 shows an example as to how to set the current amount Is to be a function of the voltage Vcc.
Figure 14:
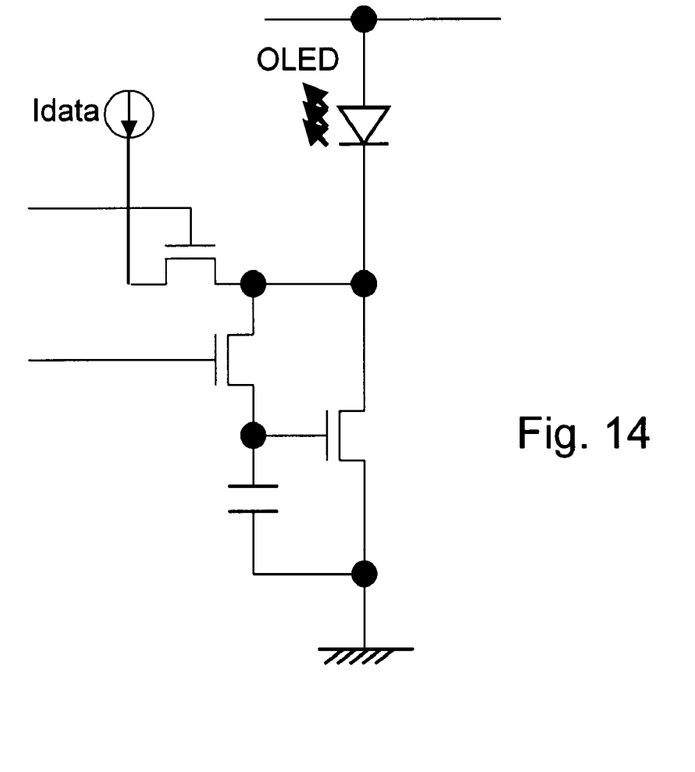
FIGS. 14 and 15 show several examples of active OLEDs.

A third method is as follows. This method requires setting up a relationship between the current amount Is and the supply voltage Vcc, i.e., Is=f (Vcc). FIG. 13 shows one such example. In the function circuit 30, the voltage Vx is a dividend voltage of Vcc (as illustrated by the devices D1 and D2; however, the voltage Vx is not necessary a dividend voltage of Vcc, but may be of any other relationship with Vcc). Thus Is equals to (VREF/R1)+(Vx/R2); in other words, the relationship between Is and Vcc may be adjusted by adjusting R1 and R2. After a proper relationship between Is and Vcc is established, let the circuit 30 work with the voltage supply circuit according to its feedback adjustment mechanism. The voltage supply circuit will adjust the supply voltage Vcc automatically for circuit 30, and since the current amount Is is a function of the supply voltage Vcc, the current amount Is is automatically adjusted to the optimum value.

Figure 15:
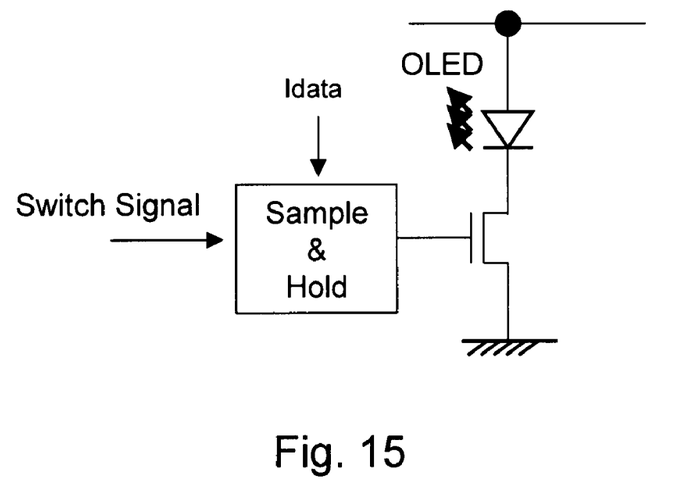

All the above hardware and method embodiments are described with reference to passive OLED panel control circuit structure. However, the present invention can also be applied to active OLED panels. An OLED in an active OLED panel is controlled by an active manner, e.g., as shown in FIGS. 15 and 16. In these two figures, the current signal Idata controls the brightness of the OLED. Under the same spirit of the present invention, one may check the matching condition among the current signals of the OLEDs to determine the supply voltage Vcc, so that the supply voltage Vcc is the lowest but sufficient to let all the OLEDs work normally.

The spirit of the present invention has been explained in the foregoing with reference to its preferred embodiments, but it should be noted that the above is only for illustrative purpose, to help those skilled in this art to understand the present invention, not for limiting the scope of the present invention. Within the same spirit, various modifications and variations can be made by those skilled in this art. For example, additional devices may be interposed between any two devices shown in the drawings, such as a delay circuit or a switch, without affecting the primary function of the circuit. As another example, the sensed current signals do not necessarily have to be compared in a group of three or more signals, but may be compared two-by-two, and the compared result may be subject to logic operations. In view of the foregoing, it is intended that the present invention cover all such modifications and variations, which should interpreted to fall within the scope of the following claims and their equivalents.

What is claimed is:

1. A control circuit for an OLED panel, comprising:
   a plurality of OLEDs respectively located in a corresponding plurality of paths;
   a current amount determination circuit determining current amounts on said plurality of paths;
   a voltage supply circuit under control by a control signal, for providing an output voltage to said current amount determination circuit; and
   a matching feedback adjustment circuit for generating said control signal according to a difference among said current amounts of said plurality of paths, wherein said matching feedback adjustment circuit includes:
      a minimum signal selector circuit for selecting a signal representing the lowest one of said current amounts of said plurality of paths,
      a maximum signal selector circuit for selecting a signal representing the highest one of said current amounts of said plurality of paths, and
      a comparator or an operational amplifier, having inputs respectively electrically connected with said minimum signal selector circuit and maximum signal selector circuit, and an output for generating said control signal,
   wherein:
   (a) said matching feedback adjustment circuit further includes a voltage source between said comparator or said operational amplifier and said minimum signal selector circuit, or
   (b) said minimum signal selector circuit has an internal voltage difference between its inputs,
   whereby said voltage source, or said internal voltage difference, or a sum of said voltage source and said internal voltage difference, determines a value such that when said difference among said current amounts of said plurality of paths is larger than said value, said voltage supply circuit increases its output voltage; when said difference among said current amounts of said plurality of paths is smaller than said value, said voltage supply circuit decreases or keeps its output voltage.

2. A control circuit for an OLED panel, comprising:
   a plurality of OLEDs respectively located in a corresponding plurality of paths;
   a current amount determination circuit determining current amounts on said plurality of paths;
   a voltage supply circuit under control by a control signal, for providing an output voltage to said current amount determination circuit; and
   a matching feedback adjustment circuit for generating said control signal according to a difference among said current amounts of said plurality of paths,
   wherein said current amount determination circuit includes a plurality of current mirrors for respectively controlling said current amounts on said plurality of paths.

3. The control circuit as claimed in claim 2, wherein said current amount determination circuit includes a main transistor and a first plurality of digital to analog circuits, each said digital to analog circuit including a second plurality of transistors, whereby said main transistor and one of said second plurality of transistors in each said digital to analog circuit forms a current mirror dynamically.

4. A control method for an OLED panel comprises:
   providing a supply voltage to a plurality of paths, each path having a corresponding OLED;
   detecting a difference among said current amounts of said plurality of paths;
   when said difference among said current amounts of said plurality of paths is larger than a predetermined value, increasing said supply voltage; and
   when said difference among said current amounts of said plurality of paths is smaller than said predetermined value, decreasing or keeping said supply voltage,
   wherein the step of detecting a difference includes: sensing signals representing said current amounts of said plurality of paths, and comparing the sensed signal having the minimum value with the sensed signal having the maximum value.

5. A control method for an OLED panel comprises:
   providing a supply voltage to a plurality of paths, each path having a corresponding OLED;
   detecting a difference among said current amounts of said plurality of paths;
   when said difference among said current amounts of said plurality of paths is larger than a predetermined value, increasing said supply voltage;
   when said difference among said current amounts of said plurality of paths is smaller than said predetermined value, decreasing or keeping said supply voltage; and
   providing a main path, and mirroring current on the main path to said plurality of paths proportionally.

6. The method as claimed in claim 5, further comprising the steps of:
   providing a transistor on said main path;
   fixing said supply voltage at a voltage value;
   adjusting the amount of said current on said main path to control the gate to source voltage of said transistor;

fixing said current amount on said main path;
resuming said supply voltage to a state in which it is adjustable; and
adjusting said supply voltage according to said difference among said current amounts of said plurality of paths.

7. The method as claimed in claim 5, further comprising the steps of:
adjusting the amount of said current on said main path; and
adjusting said supply voltage according to a relationship between said current amount on said main path and said supply voltage.

8. The method as claimed in claim 5, further comprising the steps of:
setting the amount of said current on said main path to be a function of said supply voltage;
adjusting said supply voltage according to said difference among said current amounts of said plurality of paths; and
determining said current amount on said main path.

* * * * *